United States Patent [19]

Bauck et al.

[11] Patent Number: 4,620,252
[45] Date of Patent: Oct. 28, 1986

[54] SYMMETRICAL COIL ACTUATOR FOR A MAGNETIC DISK DRIVE

[75] Inventors: Randall C. Bauck, East Layton; Peter S. Kleczkowski, Ogden, both of Utah

[73] Assignee: Iomega Corporation, Ogden, Utah

[21] Appl. No.: 440,366

[22] Filed: Nov. 9, 1982

Related U.S. Application Data

[63] Continuation-in-part of Ser. No. 259,696, May 1, 1981, abandoned.

[51] Int. Cl.$^4$ .......................... G11B 5/55; G11B 21/08; H02K 33/00; H02K 35/00
[52] U.S. Cl. ........................ 360/106; 360/105; 360/97; 310/36
[58] Field of Search .................. 360/106, 97, 99, 105, 360/104, 109; 310/36

[56] References Cited

U.S. PATENT DOCUMENTS

| Re. 31,278 | 6/1983 | Schmider | 310/268 |
|---|---|---|---|
| 3,678,481 | 7/1972 | Dalziel et al. | 360/97 |
| 3,815,150 | 6/1974 | Stoddard et al. | 360/97 |
| 3,912,956 | 10/1975 | Müller | 310/268 |
| 3,990,111 | 11/1976 | Elliott | 360/99 |
| 4,071,867 | 1/1978 | Rejcha | 360/109 |
| 4,089,029 | 5/1978 | Castrodale et al. | 360/99 |
| 4,125,883 | 11/1978 | Rolph | 360/99 |
| 4,150,407 | 4/1979 | Dijkstra | 360/106 |
| 4,314,295 | 2/1982 | Frandsen | 360/106 |
| 4,396,959 | 8/1983 | Harrison et al. | 360/77 |

FOREIGN PATENT DOCUMENTS 55-67975  5/1980  Japan ................................. 360/106

*Primary Examiner*—John H. Wolff
*Assistant Examiner*—Alfonso Garcia
*Attorney, Agent, or Firm*—Woodcock Washburn Kurtz Mackiewicz & Norris

[57] ABSTRACT

An actuator for a magnetic disk drive includes a planar coil which is symmetrical with respect to the center of rotation and has substantially straight active sections extending from the center of rotation on opposite sides of the center of rotation. Four permanent magnets provide a magnetic field. When current is applied to the planar coil, magnetic forces rotate the coil, and an attached actuator arm, about the center of rotation. The symmetrical coil sections eliminate or reduce torsional forces thereby avoiding vibration, improving bearing life and reducing potential servo loop instability.

9 Claims, 5 Drawing Figures

4,620,252

SYMMETRICAL COIL ACTUATOR FOR A MAGNETIC DISK DRIVE

BACKGROUND OF THE INVENTION

This invention relates to magnetic disk drives, and more particularly, to a new magnetic head actuator, having improved bearing life, reduced vibration, and reduced potential servo loop instability.

Recently, magnetic disk drives which write and read digital data from flexible magnetic disks have been extensively used. These are frequently referred to as "floppy" disks and "floppy disk drives". These drives have been extensively used for small, so-called microcomputer, systems for word-processing applications, and the like. Examples of floppy disk drives are shown in U.S. Pat. Nos. 3,990,111—Elliott, 3,678,481—Dalziel, et al, 3,815,150—Stoddard, et al, 4,125,883—Rolph and 4,089,029—Castrodale, et al.

These floppy disk drives normally have a linear magnetic head actuator which steps from track to track of the magnetic disk.

Larger disk drives, such as those used with mini-computer systems, use a rotary actuator which has the same movement as a phonograph tone arm. Examples of such disk drives include the IBM System 32 disk drive. These disk drives have better performance characteristics than the floppy disk drives.

"ROTARY PRINTED CIRCUIT COIL ACTUATOR FOR A MAGNETIC DISK DRIVE", Ser. No. 259,696, filed May 1, 1981, now abandoned, Bauck, describes a rotary actuator in which a planar coil and stationary permanent magnets cooperate to rotate an actuator arm in response to current applied to the coil.

It is an object of the present invention to improve the operating characteristics of this type of actuator.

SUMMARY OF THE INVENTION

In accordance with the present invention, a magnetic disk drive actuator has a planar coil which is symmetrical with respect to the center of rotation of the actuator and has substantially straight active sections extending on opposite sides from said center of rotation. Four permanent magnets are respectively positioned adjacent to each of the active sections of the coil. Twisting, or torsional, forces which would otherwise be present in a non-symmetrical, or one sided, planar coil, are counterbalanced in the actuator of the present invention. This reduces or eliminates potential modes of vibration, it increases bearing life, and reduces the possibility of servo loop instability. The actuator of the present invention also has the advantage that the force constant variation is more uniform from actuator to actuator, due to the greater number of magnets.

In accordance with another aspect of the invention, the four different coil sections may be connected in different combinations to provide different operating characteristics.

In accordance with another aspect of the invention, the top and bottom members of the actuator, which form the housing for the actuator, also serve as the return path for the magnetic flux. The spindle is mounted on the bottom return path member and the actuator is mounted in the disk drive by mounting the spindle directly on a datum surface on the base plate in the disk drive. This eliminates costly housing and mounting members such as are otherwise present, for example, in the actuator on which this invention is an improvement. The result is a significant reduction in cost over the prior actuators.

The foregoing and other objects, features and advantages of the invention will be better understood from the following more detailed description and appended claims.

SHORT DESCRIPTION OF THE DRAWINGS

FIGS. 1a and 1b respectively depict the coil of the actuator upon which the present invention is an improvement and the symmetrical coil of the present invention;

DESCRIPTION OF THE PREFERRED EMBODIMENT

Figure 3:
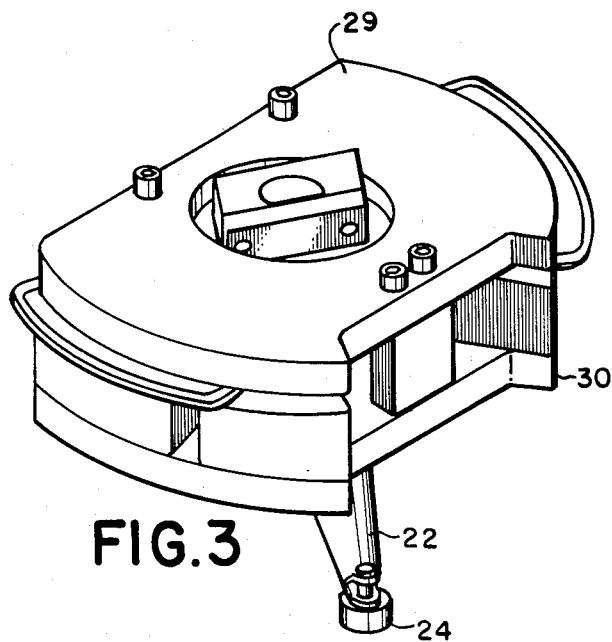
FIG. 3 shows the assembled actuator.
Figure 1A:
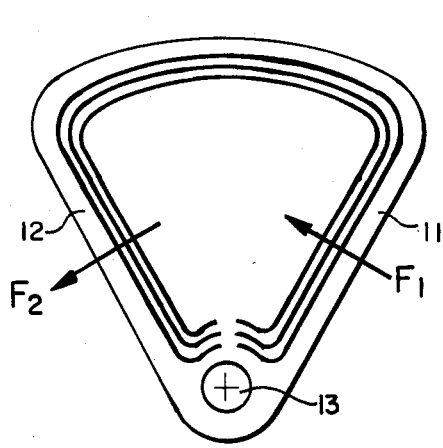
Figure 1B:
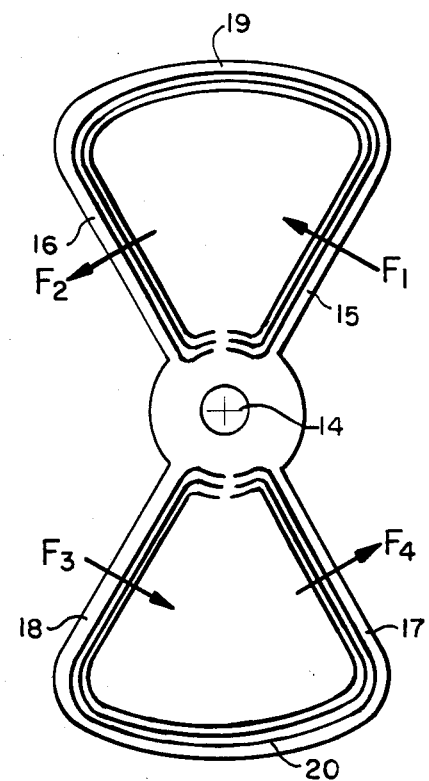

Referring to FIG. 1a, the actuator coil upon which the present invention is an improvement has active traces, or sections, 11 and 12 which extend from the center of rotation 13. When current is supplied to the coil these traces cooperate with adjacent permanent magnets to exert force which rotates the coil about its center of rotation 13. These same forces exert a torsional twist to the actuator which biases the actuator against its bearings. This reduces bearing life, causes vibration and contributes to potential servo loop instability. The actuator coil of the present invention is shown in FIG. 1b. The coil is symmetrical with respect to the center of rotation 14. It has substantially straight active sections 15 and 16 extending from one side of the center of rotation and substantially straight active sections 17 and 18 extending on the opposite side of the center of rotation. The coil is planar and all of the active sections are in the same plane. Arcuate return traces 19 and 20 complete the current path which is supplied from two connections near the center of rotation. In a preferred embodiment the coil is a printed circuit, but a wound wire coil may be fabricated. The coil sections can be connected in various combinations. FIG. 1a depicts an arrangement in which all of the active sections contribute force which rotates the coil in one direction when current flow is in one direction in the coil, and all aid in rotating the coil in the opposite direction when the current flow is in the opposite direction. While the rotational forces about the center of rotation are cumulative, the torsional forces cancel one another. Assuming that $F_1$ is equal to $F_3$ and $F_2$ is equal to $F_4$, the net torsional force is zero.

Figure 2:
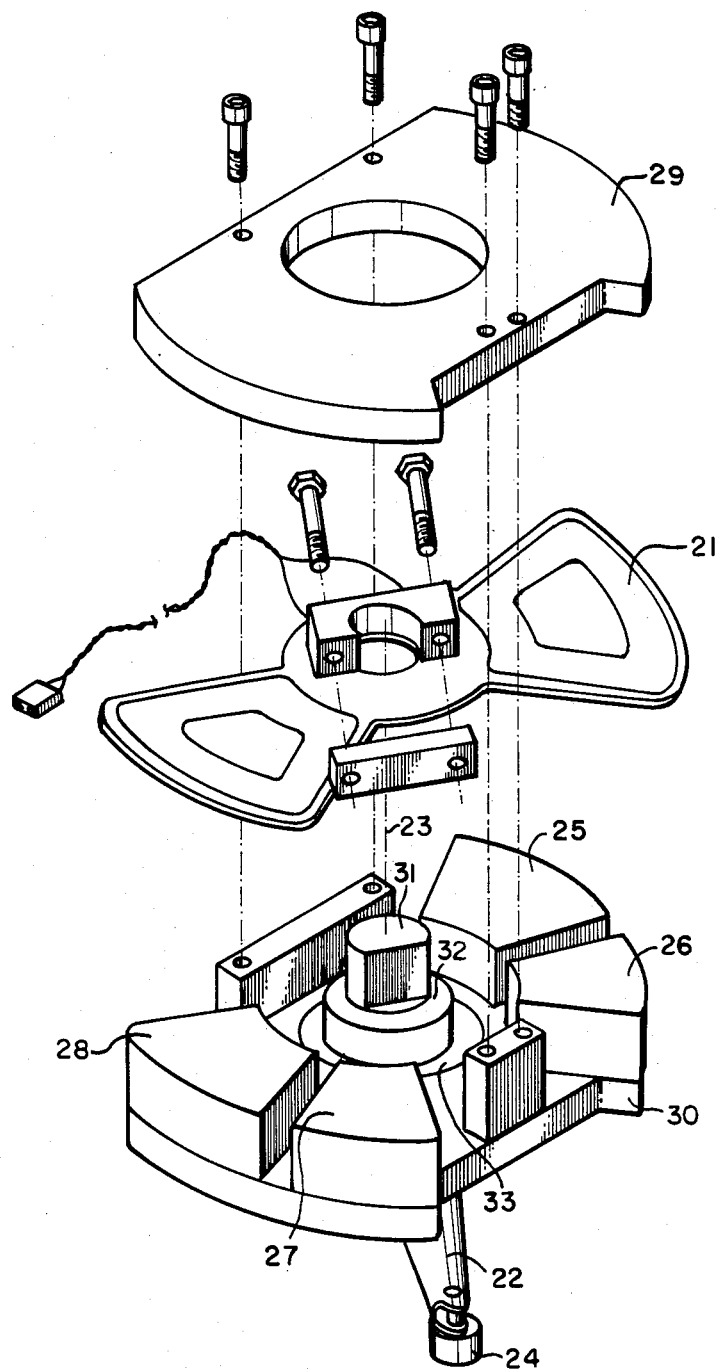
FIG. 2 is an exploded view of the actuator.

Referring to FIG. 2, the planar coil 21 of the present invention is attached to an actuator arm 22 which rotates about the center of rotation 23. Actuator arm 22 has a magnetic read/write head 24 which travels along an arcuate path adjacent to the magnetic disk as the arm is rotated. Permanent magnets 25–28 are positioned adjacent to each of the active sections of the coil 21. The current through the coil produces magnetic forces on the coil which act about the center of rotation 23. Magnets 25–28 have pole faces which are arcuate segments with centers of radii at the center of rotation 23. The magnets are positioned so that only active traces are adjacent to the pole faces as the coil rotates. In an exemplary embodiment the top pole faces of the magnets 25–28 are south, north, south, north, respectively. Top return path member 29 and bottom return path member 30 form a housing for the planar coil 21 and the permanent magnets 25-28. The members 29 and 30 also provide a return path for the magnetic flux of the magnets 25-28. This has the advantage of eliminating the need for a separate housing and return path members, thereby achieving a cost saving.

Figure 4:
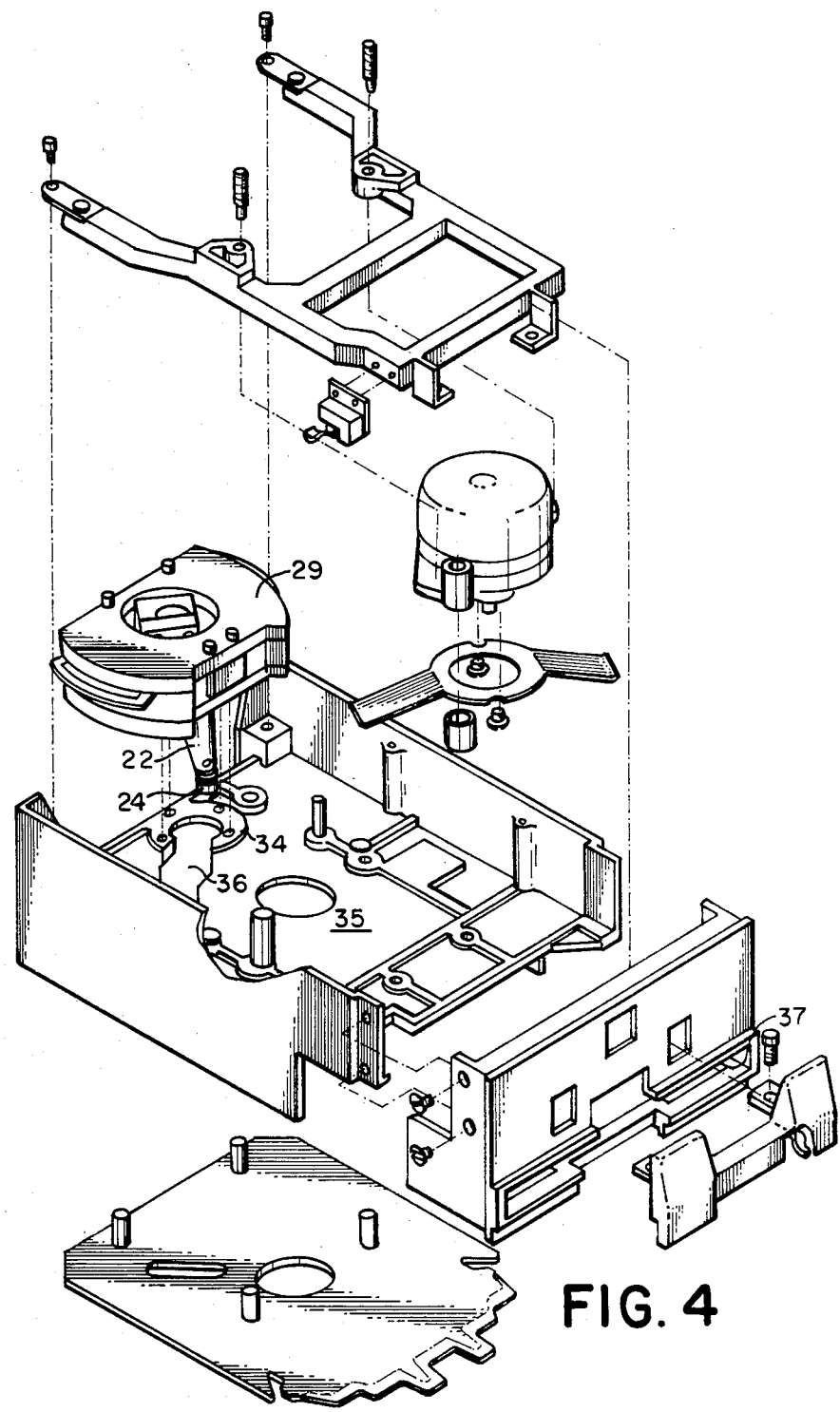
FIG. 4 is a view of the actuator mounted in the magnetic disk drive.

The planar coil 21 and the actuator arm 22 are mounted on a spindle which includes a shaft 31, a bearing housing 32 concentric with the shaft and having bearings for rotation of the shaft therein, and a concentric mounting flange 33. The mounting flange 33 is fixed in a hole in the bottom return path member 30. As best shown in FIG. 4, the mounting flange of the actuator is mounted on a datum surface 34 on the base plate 35 of the magnetic disk drive. The arm 22 extends through hole 36 so that the head 24 can engage a magnetic disk which is enclosed in a cartridge inserted into the opening 37 in the front of the drive. The magnetic disk drive is of the type more fully shown and described in FLEXIBLE MAGNETIC DISK DRIVE USING A RIGID CARTRIDGE, Bauck et al, filed April 22, 1981.

While a particular embodiment of the invention has been shown and described, various modifications are within the true spirit and scope of the invention. Dependent claims are, therefore, intended to cover all such modifications.

What is claimed is:

1. A magnetic disk drive actuator for moving a magnetic head in an arcuate path in read/write relationship with a magnetic disk comprising:
   an actuator arm rotatable about a center of rotation:
   a read/write head mounted on said arm so that said head travels along said arcuate path as said arm is rotated;
   a planar coil having only two active sections connected in series and attached to said arm for rotating it about said center of rotation, said planar coil being symmetrical with respect to said center of rotation and having first and second substantially straight active sections extending from one side of said center of rotation and third and fourth substantially straight active sections extending in the same plane on the opposite side of said center of rotation, and symmetrical with said first and second sections having arcuate return traces joining said first and second straight active sections and arcuate return traces joining said third and fourth straight active sections, said active sections and said return traces being connected in series to two connections for supplying current to said coil; and
   magnetic means positioned adjacent to each of said active sections of said coil, so that current through said active sections on opposite sides of said center of rotation produces magnetic forces on said coil which act about said center of rotation whereby the rotational forces about the center of rotation are cumulative and the torsional forces cancelled one another avoiding vibration and reducing potential servo loop instability.

2. The actuator recited in claim 1 wherein said magnetic means includes:
   four permanent magnets respectively positioned adjacent the four active sections of said coil.

3. The actuator recited in claim 2 wherein said magnets have pole faces which are arcuate segments with centers of radii at said center of rotation, said magnets being positioned so that only active traces are adjacent said pole faces as the coil rotates.

4. The actuator recited in claim 1 wherein said arcuate return traces have centers of radii at said center of rotation.

5. The actuator recited in claim 1 wherein said planar coil is a printed circuit coil.

6. The actuator recited in claim 1 further comprising:
   top and bottom return path members forming a housing for said planar coil and said magnetic means and providing a return path for the magnetic flux of said magnetic means.

7. The actuator recited in claim 6 further comprising:
   a spindle, said planar coil and said actuator arm being mounted on said spindle, said spindle being mounted for rotation in said bottom return path member.

8. The actuator recited in claim 7 wherein said spindle includes a shaft on which said planar coil and said arm are mounted;
   a bearing housing concentric with said shaft and having bearings for rotation of said shaft therein; and
   a concentric mounting flange for said bearing housing, said mounting flange being mounted in the bottom return path member.

9. The actuator recited in claim 8 wherein said mounting flange is mounted on a datum surface in the base plate of said magnetic disk drive.

* * * * *